United States Patent Office 3,109,800
Patented Nov. 5, 1963

3,109,800
OLEFIN SEPARATION
Dexter B. Sharp, Vandalia, Ohio, assignor to Monsanto Chemical Company, St. Louis, Mo., a corporation of Delaware
No Drawing. Filed Aug. 22, 1960, Ser. No. 50,864
8 Claims. (Cl. 204—162)

The present invention relates to the selective photoxidation of olefins. In particular, the invention relates to photosensitized oxidation reactions in which one type of unsaturated bond is more readily oxidized than another type of unsaturated bond.

In one aspect, the invention is directed to the photoxidation of internal olefins in the presence of terminal olefins, thereby providing a method of purifying terminal olefins.

In another aspect, the invention is directed to a process of selectively photoxidizing at one double bond in a diolefinic compound, thereby producing hydroperoxide and thence alcohol or other derivatives of the diolefinic compound.

It is an object of the present invention to provide a procedure for removing internal, i.e., non-alpha, olefins from mixtures of olefinic hydrocarbons.

It is a further object of the invention to provide a procedure especially adapted to cause photoxidation at internally unsaturated positions while leaving terminally unsaturated, e.g., vinyl, positions relatively unaffected, and to provide a procedure of general utility in the preparation of organic intermediates and compounds when this type of conversion is desired.

The terms "photoxidizing," "photoxidation," "photosensitized," etc., as used herein in the specification and claims are intended to cover true photosensitized oxidation reactions in which light in the presence of a photosensitizing catalyst causes the oxidation; the terms are not intended to include autoxidations, proceeding by a free radical mechanism in which irradiation with light serves to initiate free radicals. The true photosensitized oxidation reactions are characterized by the fact that the rate of the reaction is approximately proportional to the intensity of irradiation at both high and low intensities, and the fact that in general ordinary oxidation inhibitors do not retard the reaction.

The photoxidation reaction utilized in the present invention can be postulated according to the following equations, in which 2-methylbutene-2 is employed as an exemplification of internally unsaturated olefins:

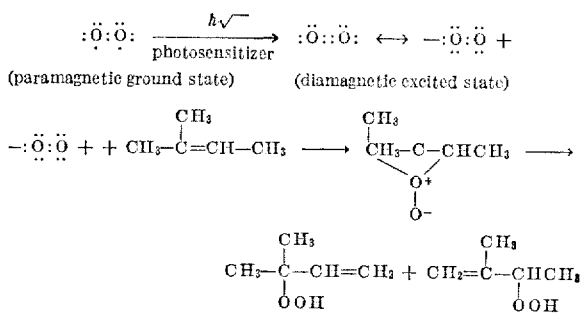

In these reactions, a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of 3600 to 8000 Angstroms has been found very suitable. While light in the ultra-violet region, particularly the near ultraviolet region, can be used as it is effective to some extent in causing photoxidation, it is desirable to avoid use of light in these regions as it tends to catalyze autoxidations and other free-radical type reactions. High-energy, ultra-violet light may also cause accelerated catalyst photo-decomposition.

It will be realized that the photoxidation utilized in the present invention proceeds in a manner different from autoxidations occurring by a free radical mechanism; in the latter case, the free radical formation occurs on a carbon atom alpha to the double bond, and the hydroperoxide is then formed on this carbon atom, or in the event of an isomeric shift, on another carbon atom alpha to the original double bond, rather than on one of the carbon atoms of the original double bond.

The photoxidation utilized in the present invention also differs from the thermal oxidations of olefins, in which an epoxide is formed directly across the original position of the double bond. The thermal oxidations of olefins, insofar as the variance in their oxidation rates is such as to permit separation of terminal olefins from other olefinic hydrocarbons in accordance with the procedures described herein, are suitable for coverage in a copending application directed to separation of olefinic hydrocarbons by thermal oxidation, rather than in the instant application.

In the reactions of the present invention, a photosensitizer must be present, presumably to catalyze the conversion of the oxygen in the ground state to an active polymerizable state. Any photosensitizer can be employed, although, of course, some will be many times more effective than other and some will be of little value in actual practice. In general, it is preferred to employ a porphyrin type catalyst in the present invention, for example, porphyrins or the related porphyrazines, phthalocyanines or chlorophylls. For simplicity, any compound having the basic porphyrin structure, i.e., four pyrrole rings connected by

groups, is considered a porphyrin.

Particularly useful catalysts for the present invention are the aromatic group meso-substituted porphyrin compounds. Among such aromatic-substituted porphyrins are the meso-tetraarylporphyrins; porphyrins, of course, are the class of compounds in which four pyrrole nuclei are linked together in a circular pattern by four carbon atoms so that a great ring containing 16 atoms is formed; in the meso-tetraarylporphyrin catalysts, phenyl (or other aryl) groups are substituted on the bridging carbon atoms, such phenyl groups as, for example, phenyl, chlorophenyl, dichlorophenyl, methylphenyl, N,N - dimethylaminophenyl, hydroxphenyl; etc., as applicable; di-, tri-, and tetracyclic aryl groups can be used, e.g., meso-naphthyl-substituted porphyrins are very effective photosensitizing catalysts; anthracyl and phenanthryl groups are also effective. Of course, the porphyrin catalysts, including the aryl porphyrin catalysts, can have various other substituents, particularly at the β and β' positions of the pyrrole rings, for example, such substituents as ethyl, methyl, vinyl, and propionic acid groups, etc., or benzo groups linking two positions of a given pyrrole ring, and such substituents can be present in the tetraphenylporphyrin catalysts used in the present invention. In addition to the substituents in the phenyl groups noted above, the phenyl or aryl groups in the photosensitizing catalysts can have any or a combination of such substituents, for example, as alkyl groups, e.g., methyl, ethyl, propyl, isopropyl, butyl, isobutyl, secondary butyl tertiary butyl n-amyl, isoamyl, tertiary amyl, n-hexyl, decyl, dodecyl, etc., alkoxy substituents, e.g., methoxy, ethoxy, isopropoxy, butoxy, hexyloxy, etc.; halogen substituents, e.g., bromine, chlorine, fluorine, and iodine; and any other substituents which do not change the fundamental aromatic character of the groups. As used herein, the terms aryl and phenyl are intended to include all groups which are essentially aromatic and which contain one or more benzene rings.

The aforesaid aryl porphyrins can be prepared and used according to procedures set forth in my copending application S.N. 696,063, filed November 13, 1957, of which this application is a continuation-in-part, and which issued as Patent No. 2,950,237. Other suitable aromatic substituted porphyrin catalysts are octaphenylporphyrins and porphyrazines as set forth in my copending application S.N. 696,061, filed November 13, 1957, and issued as Patent No. 2,951,798, or meso-heterocyclic substituted porphyrins as set forth in my copending application S.N. 696,064, filed November 13, 1957, issued as Patent No. 2,951,799; or benzoporphyrins as set forth in my copending application S.N. 696,065, filed November 13, 1957, and issued as Patent No. 2,951,800; or the porphyrazines set forth in my copending application S.N. 696,066, filed November 13, 1957, and issued as Patent No. 2,951,797; the present application being a continuation-in-part of the foregoing applications; the disclosure of all of the foregoing catalysts, even fundamental porphyrin structures having little or no substitution, e.g. porphyrin itself, will be useful to some extent in the present invention, although far inferior to the foregoing catalysts. Similarly, other photosensitizing catalysts can be used, even though the results are inferior. For example, such materials as chlorophyll, eosin, methylene blue, methyl violet, fluorescein, hemin, rubrene, anthracene, tetracene, acridine, and any other catalysts capable of photosensitization in photoxidation procedures can be used. It is also possible to utilize phthalocyanines for this purpose. The above materials can be in any form capable of causing photosensitization; e.g., any of the pure or impure forms of chlorophyll, leaf extracts, etc., can be used so long as they cause photosensitization.

The present invention is particularly suited to the separation of 1-alkenes from other alkenes, for example, to the separation of 1-alkenes of 2 to 20 or so carbon atoms, of straight chain or forked chain or even highly branched structure, from hydrocarbons having internal unsaturation. The internally unsaturated hydrocarbons are photoxidized to hydroperoxides, and the 1-alkenes, which are relatively stable to photoxidation can then be removed by distillation or other separation procedures. Of course, if desired, the hydroperoxides can be reduced to alcohols or converted to other derivatives prior to the separation by fractional distillation or other suitable procedure. It will be appreciated that the degree of branching of the internally unsaturated olefins will affect to some extent the ease of their photoxidizability. However, the terminal olefin will be less subject to photoxidation than the corresponding 1-olefin having the same branching in proximity to the double bond; for example, 2-methyl-1-butene is much less readily photoxidized than 2-methyl-2-butene. Viewed in another aspect, the present invention can be considered as a process for removing olefins of branched structure from olefins having a lower degree of branching.

The process of the present invention will probably have its most important application in the separation of olefins from their isomers of the same molecular weight. It is frequently difficult to separate compounds from their isomers by fractional distillation or other physical means. The present invention will also be particularly suited to the separation of olefins from their homologs or other related compounds of close or approximately the same boiling point when there are sufficient differences in photoxidation rate to permit separation. The invention will find particular application in the separation of certain petroleum cracking or distillation fractions into particular sub-fractions according to the degree of branching in their structures. It will be recognized that the vinyl or other terminal olefins are frequently the olefins of most value because of their propensity for polymerization and many other useful reactions, which frequently require a high degree of purity, and the present process provides a method of isolating highly pure vinyl hydrocarbons from mixtures of olefins.

The amount of photosensitizer such as a porphyrin can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular porphyrin photosensitizers. Examples of a few suitable solvents are aromatic hydrocarbons, such as benzene, toluene, etc.; acylic and cyclic alkanes, for example, n-hexane and cyclohexane; amines, for example, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, 20 to 30° C. will generally be used. Other temperatures, for example, from below 0° to 100° C. or higher, can be used; if desired, the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se. The actual quantitative amounts of oxygen supplied will vary widely, depending on the amounts and reactivity of the particular olefinic impurities as well as upon the catalyst employed and intensity of the light source, but can be in the range of from less than 0.1 cubic foot per hour to more than 1 cubic foot per hour, for 100 grams of alkenes, when the oxygen gas is being passed through the alkenes. Of course, efficient contact of the oxygen with the alkenes can also be effected by other means, as by maintaining under oxygen pressure with agitation, or by counter current contact in a reactor, or by any other suitable means.

The following examples illustrate, but do not limit, the invention.

EXAMPLE 1

A flat-sided flask, immersed in a glass battery jar filled with circulating cooling water, was provided with meters for measuring oxygen input and exit gases and was illuminated with two General Electric 500 watt PAR spotlights. A hexene mixture, 100 grams, was charged to the flask. The mixture was obtained by dimerization of propylene and contained substantial amounts of internally unsaturated and branched hexenes, as well as terminal hexenes. As catalyst, 5 ml. of $\alpha,\beta,\gamma,\delta$-tetraphenylporphyrin in pyridine was added, the concentration of catalyst being such as to give a concentration of $1.4 \times 10^{-4}$ moles/liter in the reaction mixture. Oxygen was passed into the flask while the hexene mixture was irradiated with light from the two lights. The amount of oxygen absorbed was determined by the difference between the moles of oxygen entering the flask, and moles of oxygen leaving the flask. After three hours, a total of 0.095 mole had been absorbed, indicating that about 8% of the hexene mixture had been photoxidized. During the photoxidation, 37.5 grams of the hexene were entrained in the oxygen and recovered in a cold trap at −70° C. The 62.7 grams of the photoxidized reaction mixture was distilled under reduced pressure into a Dry Ice-cooled receiver. The material was distilled, with warming, until the distillation pot temperature was 35° C., to give 45.9 grams of hydrocarbon, which, together with that recovered in the cold traps, made a total of 82.4 grams. Losses of hexene appeared to be about 6–7 g. during these operations. The residue in the distillation pot was 14.3 grams, of which about 5 grams was pyridine, leaving about 9.3 grams of hydroperoxyhexene; the moles of oxygen absorbed during the reaction would indicate production of 11 grams of hydroperoxyhexene.

Vapor phase chromatographic analysis of the original hexene mixture and the recovered hexenes indicated the following:

| Olefin | Original percentage | Original moles | Final moles | Moles removed |
| --- | --- | --- | --- | --- |
| 4-methyl-1-pentene | 1.8 | 0.021 | 0.020 | 0.001 |
| 4-methyl-trans-2-pentene | 6.8 | 0.081 | 0.074 | 0.007 |
| 4-methyl-cis-2-pentene | 34.9 | 0.416 | 0.397 | 0.019 |
| 1-hexene | 8.6 | 0.012 | 0.100 | 0.002 |
| trans 3-hexene and/or 2-methyl-1-pentene | 33.3 | 0.396 | 0.382 | 0.014 |
| cis-2-hexene | 13.6 | 0.162 | 0.106 | 0.056 |

It is apparent from the foregoing that the photoxidation removed more of the internal olefins than terminal olefins. For example, about 56 times more 2-hexene was removed than 4-methyl-1-pentene. It is also notable that the results here and other experimental work indicate the removal rate to be independent of the concentration, thus making it feasible to use the present process even when removing the last traces of a particular branched olefin. Aside from the terminal olefins, variations are also apparent in the susceptibility of the other olefins to photoxidation, depending upon their degree of branching, and any of these variations can be utilized for the separation of the olefins from each other.

EXAMPLE 2

The photoxidation equipment described in Example 1 was adapted to have a Dry Ice-cooled reflux condenser in the oxygen outlet line to reduce entrainment of hydrocarbon in the off-gas stream. A mixture of hexenes (dipropylene, $n_D^{25.5}$ 1.3950) was charged in a 100 gram amount along with tetraphenylporphine in 5 ml. pyridine to give a catalyst concentration of $1.4 \times 10^{-4}$ moles/liter. In two and one-half hours at 22° C. a total of 0.194 mole of oxygen was absorbed indicating photoxidation of about 16.3% of the hexenes. The 104.7 grams of reaction mixture was distilled at 150 mm. Hg until the distillation vessel temperature reached 40° C. A 71.7 gram amount of hexene distilled, leaving a residue of 24.4 grams. Of this, about 22 g. was hydroperoxyhexene. In these operations, about 10 g. of hexene was lost mechanically. The distilled material had a refractive index, $n_D^{25.5}$ 1.3942 compared to 1.3950 for the original mixture of hexenes.

Chromatography of the original hexene mixture compared with the recovered hexenes indicated the following, with respect to the major constituents:

| Olefin | Original percentage | Original moles | Final moles | Moles removed |
| --- | --- | --- | --- | --- |
| 4-methyl-cis-2-pentene | 4.7 | 0.056 | 0.047 | 0.01 |
| 1-hexene | 10.2 | 0.122 | 0.117 | 0.00 |
| trans-2-hexene | 4.0 | 0.048 | 0.052 | 0.00 |
| 2-methyl-2-pentene | 34.2 | 0.406 | 0.332 | 0.07 |
| 3-methyl-trans-2-pentene | 12.8 | 0.152 | 0.138 | 0.01 |
| 3-methyl-cis-2-pentene | 21.1 | 0.251 | 0.214 | 0.04 |
| 2,3-dimethyl-2-butene | 4.4 | 0.052 | 0.0 | 0.05 |

The above results clearly indicate that certain readily susceptible internal olefins were photoxidized more readily than 1-hexene, for which the photoxidation was too small for quantitatively significant determination under the conditions measured. The particular measurements here lacked sufficient accuracy to distinguish between olefins for which zero values are reported in the moles removed column. However, other results have demonstrated that 1-hexene is less readily photoxidized than the other olefins. With respect to 2,3-dimethyl-2-butene, it should be noted that the moles removed for comparison purposes should actually be higher, as this species was completely removed, presumably prior to the end of the photoxidation run.

EXAMPLE 3

A 100 gram amount of a commercial 1-hexene (Phillips, 95% minimum 1-hexene) was photoxidized according to the procedure of Example 2. The oxygen absorbed during a two and one-half hour photoxidation indicated that about 1.5% of the hexene was oxidized. The hexene was then stripped from the reaction mixture at 150 mm. Hg, 95.7 grams being recovered, and leaving a 3 gram residue. Refractive index of the recovered hexene was $n_D^{25.5}$ 1.3861, compared to $n_D^{25.5}$ 1.3840 for the original hexene. Vapor phase chromatography indicated that the starting hexene was essentially pure 1-hexene, but had traces of 2-hexenes. After the photoxidation, however, no 2-hexenes were detected in the vapor phase chromatogram. Thus, the sensitivity of the present process is established in removing even traces of internal olefins present as impurities in 1-alkenes.

EXAMPLE 4

From photoxidation reactions of various olefins under conditions similar to those in the foregoing examples, the following photoxidation rates were calculated. The reported rates are disappearance rates relative to 2,3-dimethyl-2-butene taken as 1.00.

Olefin: Relative rate
1-hexene _____ 0.01
trans-4-methyl-2-pentene _____ 0.07
cis-4-methyl-2-pentene _____ 0.23
2-methyl-1-butene _____ 0.13
2-methyl-2-butene _____ 0.90
2,3-dimethyl-2-butene _____ 1.00

It is apparent that all of the above olefins having more rapid photoxidation rates than 1-hexene could readily be removed from 1-hexene by the process of the present invention. Moreover, use of photoxidation in conjunction with fractional distillation would make it possible to separate mixtures of all of the above alkenes.

EXAMPLE 5

In a Warburg apparatus, the following olefins were photoxidized in air in the presence of the designated catalysts:

| Sample No. | Olefin | Catalyst |
|---|---|---|
| 1 | 2-methyl-2-butene | tetraphenylporphine. |
| 2 | 2,3,3-trimethyl-1-butene | Do. |
| 3 | 4,4-dimethyl-cis-2-pentene | Do. |
| 4 | propylene trimer | $\alpha,\beta,\gamma,\delta$-tetrakis (4-nitrophenyl) porphine. |
| 5 | do | zinc $\alpha,\beta,\gamma,\delta$-tetrakis (4-dimethylamino-phenyl) porphine. |

The olefins were used in an amount of 0.2 ml. and a 0.2 ml. pyridine solution of the catalysts was used ($1.17 \times 10^{-4}$ moles per liter); pyridine, 2.6 ml., was added to bring the total solution up to about 3 ml. The reaction rates were as follows:

*Oxygen Absorbed in Microliters*

| Sample No. | Time in Minutes | | | | |
|---|---|---|---|---|---|
| | 15 | 30 | 40 | 60 | 75 (dark) |
| 1 | 96 | 196 | 299 | 398 | 398 |
| 2 | 9 | 13 | 20 | 22 | 21 |
| 3 | 11 | 17 | 22 | 23 | 19 |
| 4 | 42 | 93 | 142 | 191 | 179 |
| 5 | 89 | 179 | 270 | 357 | 309 |

It will be noted that 2-methyl-2-butene (No. 1) has a very rapid photoxidation rate, particularly as compared to the terminal olefins and to other olefins having few hydrogens or carbons adjacent to the olefinic double bond.

EXAMPLE 6

A heptene mixture was photoxidized for an extended period under the conditions of the previous examples. Vapor phase chromatography of the starting heptene mixture indicated the presence of at least sixteen different isomers in varying proportions. Several of the major components had relative photoxidation rates as follows:

Compound: Relative rate
- XVI — 100
- XIII — 27
- X — 18
- XV — 12
- XIV — 4
- XI — 1 and were assigned the following structures, with original percentages as indicated.

- XVI — 2,3-dimethyl-2-pentene. (This is a type V olefin and such were reported to constitute 22% of the starting mixture; chromatography indicated XVI to be 22% of the original mixture.)
- XIII — 2-methyl-trans-3-hexene, 22%.
- X — 3-methyl-cis-3-hexene, 17.5%.
- XV — 3-ethyl-3-pentene, 10.8%.
- XIV — 2-trans-heptene or 2-methyl-1-heptene, 5.4%.
- XI — 2-ethyl-3-methyl-1-butene or 2-methyl-trans-3-hexene, 4.7%.

For comparison purposes, the changes in relative percentages of different olefins after specified photoxidation periods are shown.

| Olefin | Start, percent | 1.5 hours, percent | 3.1 hours, percent | 5.2 hours, percent |
|---|---|---|---|---|
| XVI | 22.6 | 1.8 | 1.5 | 0.6 |
| XIII | 22.2 | 24.8 | 17.3 | 4.9 |
| XI | 4.7 | 6.7 | 11.2 | 23.5 |
| XIV | 5.4 | 6.6 | 5.7 | 0.0 |

The increasing percentage of XI in the heptene mixture together with the decreasing percentages of XIV, XVI, and XIII demonstrates that the latter three olefins can readily be removed from a mixture containing XI, according to the procedure of the present invention.

It will be appreciated that the selective photoxidation aspect of the present invention encompasses a wide variety of reactions. For example, 3-vinyl-$\Delta^{1,6}$-cyclohexene when photoxidized under the conditions of Example 2 or in a Warburg apparatus under slightly less intense illumination, undergoes preferential photoxidation at the ring double bond to give 6-hydroperoxy-3-vinyl-$\Delta^{1,2}$-cyclohexene and 1-hydroperoxy-3-vinyl-$\Delta^{5,6}$-cyclohexene. The photoxidation rate is approximately that of cyclohexene itself. The isomeric products are of interest as peroxide-containing vinyl monomers polymerizable under free radical conditions, as cross-linking agents for use in curing vinyl polymers, as a co-monomer for copolymerization with other vinyl monomers, e.g., ethylene, vinyl chloride, etc.

The olefin separation procedure of the present invention can be used in the separation of various olefin mixtures of present commercial importance, as well as in the separation of olefin mixtures of only potential importance or theoretical interest. The process can be applied to separations of alkenes in propylene dimers, trimers, tetramers, pentamers, etc.; or in the separation of alkenes in butylene, particularly isobutylene, dimers, trimers and tetramers. As further examples of particular alkene pairs which can be separated by the present process, the following are illustrative: 1-butene from 2-butene; 1-hexene from 2-hexene; 1-octene from 2-octene; 1-nonene from 2-methyl-2-octene; 1-decene from various non-terminal decenes; and 1-dodecene from various non-terminal dodecenes.

Olefins can be separated by the process of the present invention whenever there is a substantial difference in their photoxidation rates. However, the process will be most effectively employed when there is a marked difference in photooxidation rates, e.g., when one olefin in photoxidation process disappears in an amount at least ten times that of a second olefin, i.e., when the disappearance rate of one is at least ten times that of another.

The invention herein is limited only by the following claims.

What is claimed is:

1. A process for the purification of terminal alkenes which comprises subjecting a mixture of terminal alkenes with other alkenes to contact with oxygen in the presence of visible light of wave length greater than that of ultraviolet light but no greater than 8,000 Angstroms and a photosensitizing catalyst for a time sufficient to oxidize substantially all of the other alkenes to allylic hydroperoxides and separating the terminal olefins from the said allylic hydroperoxides.

2. A process for the purification of terminal alkenes which comprises contacting a mixture of alkenes comprised predominantly of terminal alkenes but also containing a small amount, less than 10% by weight of non-terminal alkenes corresponding to the said terminal alkenes except for the position of the double bond, in the presence of photosensitizing catalyst and under irradiation of visible light from a light source of at least 500 watts, with oxygen supplied at a rate at least approximating the rate at which it reacts with the olefins, for a time sufficient to convert substantially all of the non-terminal alkenes to olefinic hydroperoxides, and distilling the terminal alkenes from the reaction mixture.

3. The process of claim 2 in which the hydroperoxides are reduced to alcohols prior to the distillation.

4. The process of claim 2 in which a porphyrin catalyst is employed as photosensitizer and in an amount of from 0.0001% to 1% by weight based on the alkenes.

5. The process of claim 2 in which the catalyst is tetraphenylporphine.

6. The process of claim 2 in which the terminal olefin is 1-hexene.

7. The process of purifying olefins which comprises subjecting a mixture of olefins containing at least two olefins differing in their susceptibility to photoxidation by a factor of at least ten to intense visible light irradiation in the presence of a porphyrin catalyst and to contact with oxygen present in sufficient amount that its quantity does not affect the resulting photoxidation rate, to photoxidize substantially all of the more readily photoxidable olefin to a hydroperoxide, and discontinuing the photoxidation at a time when only minor amounts of the less readily photoxidizable olefin have been photoxidized, and separating the less readily photoxidizable olefin by distillation.

8. The process of selectively photoxidizing mixtures of olefins to obtain separate olefin and hydroperoxide products which comprises subjecting a mixture of olefins containing at least two olefins differing in susceptibility to photoxidation by a factor of at least 10 to contact with oxygen under visible light irradiation in the presence of a photosensitizing catalyst to convert the more readily photoxidizable olefins to hydroperoxides in which the hydroperoxide group is located on one of the carbon atoms which constituted part of the olefinic group in the olefin reactant, and separating the less readily photoxidizable olefins from the hydroperoxides.

References Cited in the file of this patent

UNITED STATES PATENTS 2,955,996  Mashio et al. _____ Oct. 11, 1960

FOREIGN PATENTS 614,456  Great Britain _____ Dec. 15, 1948

UNITED STATES PATENT OFFICE
CERTIFICATE OF CORRECTION

Patent No. 3,109,800                              November 5, 1963

Dexter B. Sharp

It is hereby certified that error appears in the above numbered patent requiring correction and that the said Letters Patent should read as corrected below.

Column 1, lines 54 to 59, the right-hand formula should appear as shown below instead of as in the patent:

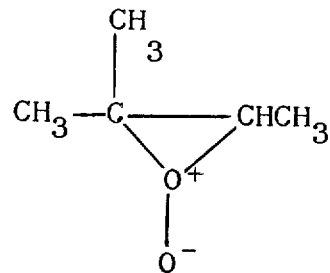

column 5, in the table, third column, line 4 thereof, for "0.012" read -- 0.102 --.

Signed and sealed this 12th day of May 1964.

(SEAL)
Attest:

ERNEST W. SWIDER                          EDWARD J. BRENNER

Attesting Officer                        Commissioner of Patents